US009849336B2

(12) United States Patent
Tilvis et al.

(10) Patent No.: US 9,849,336 B2
(45) Date of Patent: Dec. 26, 2017

(54) TEAM SPORT MONITORING SYSTEM

(71) Applicant: Polar Electro Oy, Kempele (FI)

(72) Inventors: Marko Tilvis, Oulunsalo (FI);
Vesa-Matti Suorsa, Oulu (FI)

(73) Assignee: POLAR ELECTRO OY, Kempele (FI)

( * ) Notice: Subject to any disclaimer, the term of this patent is extended or adjusted under 35 U.S.C. 154(b) by 261 days.

(21) Appl. No.: 14/634,126

(22) Filed: Feb. 27, 2015

(65) Prior Publication Data
US 2016/0250517 A1 Sep. 1, 2016

(51) Int. Cl.
G06F 19/00 (2011.01)
A63B 24/00 (2006.01)
H04Q 9/00 (2006.01)

(52) U.S. Cl.
CPC .......... *A63B 24/0062* (2013.01); *H04Q 9/00* (2013.01); *H04Q 2209/40* (2013.01); *H04Q 2209/50* (2013.01); *H04Q 2209/82* (2013.01); *H04Q 2209/845* (2013.01)

(58) Field of Classification Search
None
See application file for complete search history.

(56) References Cited

U.S. PATENT DOCUMENTS

| 8,253,586 B1* | 8/2012 | Matak | H04Q 9/00 340/870.07 |
| 2006/0030433 A1* | 2/2006 | Horsley | A63B 57/00 473/407 |
| 2008/0153670 A1* | 6/2008 | McKirdy | A63B 24/0059 482/1 |
| 2013/0041590 A1* | 2/2013 | Burich | G06F 19/3418 702/19 |
| 2014/0278229 A1* | 9/2014 | Hong | A61B 5/7455 702/160 |
| 2015/0245164 A1* | 8/2015 | Merrill | H04W 4/06 370/329 |
| 2016/0182496 A1* | 6/2016 | Weast | H04W 4/008 726/3 |

FOREIGN PATENT DOCUMENTS

WO 2014135711 A1 9/2014

OTHER PUBLICATIONS

European Search Report, Application No. EP 16 15 5202, 2 pages, dated Jun. 30, 2016.

* cited by examiner

*Primary Examiner* — Jason Yen
(74) *Attorney, Agent, or Firm* — Hoffmann & Baron, LLP

(57) ABSTRACT

A training device includes a communication circuitry configured to communicate according to Bluetooth specification, at least one processor, and at least one memory including a computer program code, wherein the at least one memory and the computer program code are configured, with the at least one processor, to cause the device to perform operations. The operations include obtaining physical activity-related measurement data of a user participating in a team sport activity, processing the physical activity-related measurement data into a physical activity-related information characterizing the physical activity of the user during the team sport activity, and broadcasting, according to the Bluetooth specification, the physical activity-related information using the communication circuitry.

19 Claims, 8 Drawing Sheets

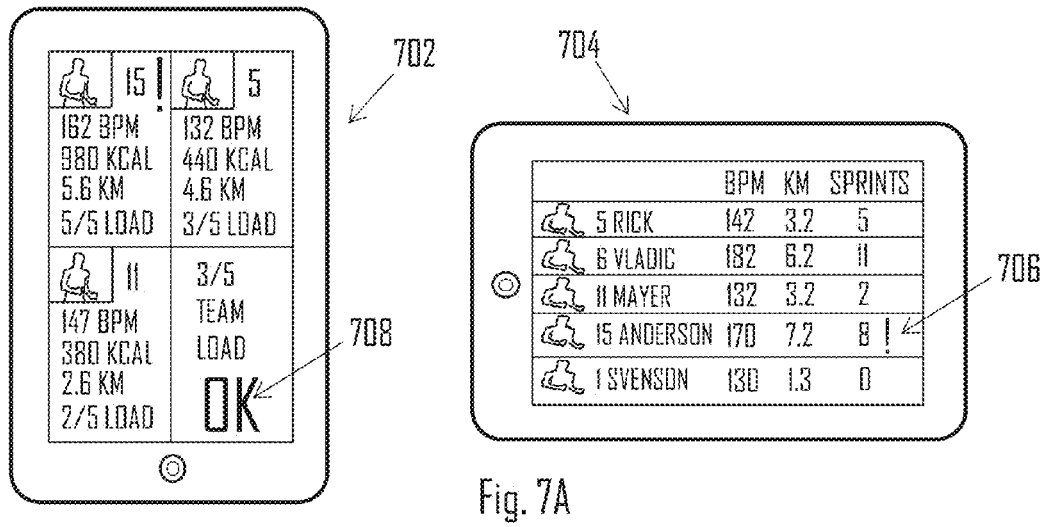

Fig. 7A

```
710 DETERMINE THAT A VALUE OF THE PHYSICAL ACTIVITY RELATED INFORMATION OF
THE AT LEAST ONE USER IS OVER A FIRST THRESHOLD
```
↓
```
720 ASSOCIATE A FIRST MARKER WITH THE PHYSICAL ACTIVITY-RELATED INFORMATION
OF THE AT LEAST ONE USER INDICATING THE EXCEEDING OF THE FIRST THRESHOLD
```

Fig. 7B

```
730 CALCULATE A COLLECTIVE PHYSICAL ACTIVITY VALUE FOR A GROUP OF USERS
BASED ON THE PHYSICAL ACTIVITY INFORMATION OF THE GROUP OF USERS
```
↓
```
740 DETERMINE THAT THE COLLECTIVE PHYSICAL ACTIVITY VALUE IS OVER A SECOND
THRESHOLD
```
↓
```
750 ASSOCIATE A SECOND MARKER WITH THE COLLECTIVE PHYSICAL ACTIVITY VALUE
INDICATING THE EXCEEDING OF THE SECOND THRESHOLD
```

Fig. 7C

TEAM SPORT MONITORING SYSTEM

BACKGROUND

Field

This invention relates to monitoring a team sport activity.

Description of the Related Art

In team sport monitoring systems, data may be transferred between devices. The transfer of the data may be a factor to the performance of the team sport monitoring system. Therefore, solutions enhancing the data transfer between the devices may be beneficial.

SUMMARY

According to an aspect, there is provided a training device comprising: a communication circuitry configured to communicate according to Bluetooth specification, at least one processor, and at least one memory including a computer program code, wherein the at least one memory and the computer program code are configured, with the at least one processor, to cause the device to perform operations comprising: obtaining physical activity-related measurement data of a user participating in a team sport activity, processing the physical activity-related measurement data into a physical activity-related information characterizing the physical activity of the user during the team sport activity, and broadcasting, according to the Bluetooth specification, the physical activity-related information using the communication circuitry.

According to an aspect, there is provided a non-transitory computer-readable storage medium comprising a computer program comprising computer program code which, when loaded into a portable electronic device cause the device to perform operations comprising: receiving broadcast messages according to Bluetooth specification from a plurality of training devices, wherein the broadcast messages comprise physical activity-related information of users participating in a team sport activity, identifying a user to which the received physical activity-related information is related to, and updating physical activity-related information of the user according to the received physical activity-related information.

According to an aspect, there is provided a system for monitoring a team sport activity, the system comprising: a plurality of training devices, wherein the plurality of training devices comprise a communication circuitry configured to communicate according to Bluetooth specification, a portable electronic device comprising a communication circuitry configured to communicate according to Bluetooth specification, and a docking station comprising connection members for the plurality of training devices and the portable electronic device, wherein the connection members enable recharging of said devices, and data transmission between the docking station and said devices, wherein the plurality of training devices are configured to obtain physical activity-related measurement data of users participating in the team sport activity, to process the physical activity-related measurement data into a physical activity-related information characterizing the physical activity of the users during the team sport activity, and to broadcast, according to the Bluetooth specification, the physical activity-related information, and wherein the portable electronic device is configured to receive at least some of the broadcasted information.

Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which

FIGS. 7A to 7E illustrate some embodiments of the invention; and

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
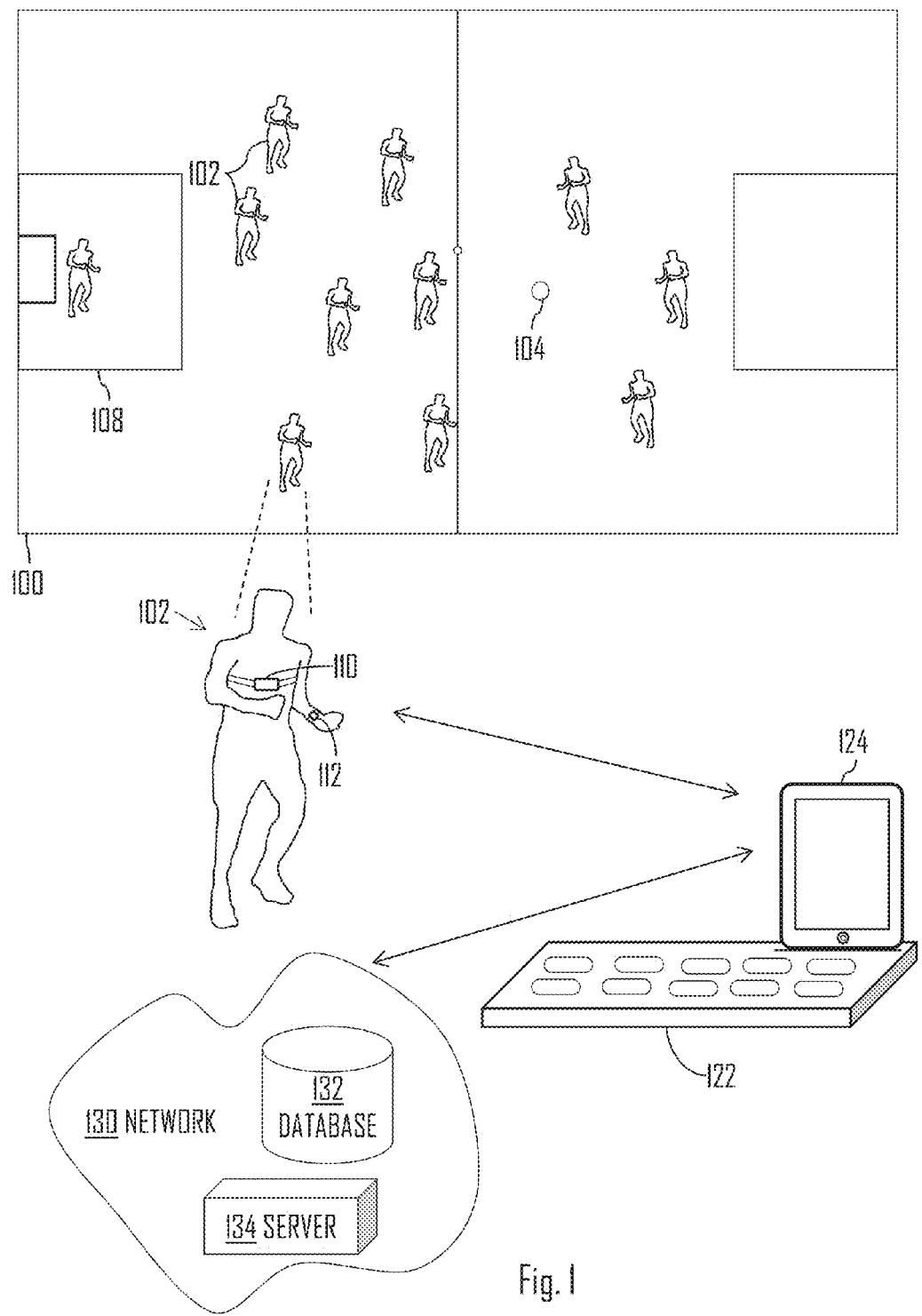
FIG. 1 illustrates a team sport monitoring system according to an embodiment of the invention.

FIG. 1 illustrates a team sport monitoring system according to an embodiment of the invention. Team sport may refer to sports, such as American football, soccer, basketball, volleyball, baseball, ice hockey, floorball, hockey, rugby, and group exercise on a gym, to name a few examples. Other examples may comprise one-to-one sports (e.g. table tennis), gymnastics, or a school gym class. However, these examples are not limiting to the term team sports, and thus it may refer to any sports activity performed by a plurality of participants. Further, the system may be used to monitor individual participants and/or group of participants of the team sport activity. Example given of the system in FIG. 1 may illustrate monitoring of European football (i.e. soccer), referred to as football hereinafter, player(s) and/or sports equipment, such as football for example.

Referring to FIG. 1, the team sport monitoring system may comprise one or more training devices 110 carried by one or more users 102 (i.e. players). The training devices 110 may comprise devices, such as smart sensors, exercise monitoring devices and/or wrist device(s) 112 (e.g. a smart watch). A training device 110 may comprise sensor(s), such as heart activity sensor(s), motion sensor(s), positioning sensor(s), stride sensor(s), to mention only a few.

The motion sensor(s) may be configured to measure the motion of the user 102, such as acceleration. In an embodiment, the motion sensor(s) comprise at least one of the following: an accelerometer, a magnetometer, and a gyroscope.

In an embodiment, the motion sensor(s) comprises an accelerometer and a gyroscope. The motion circuitry may further comprise sensor fusion software for combining the accelerometer data and gyroscope data so as to provide physical quantities, such as acceleration data, velocity data, or limb trajectory data in a reference coordinate system having orientation defined by a predetermined gyroscope orientation.

In an embodiment, the motion sensor(s) comprises a gyroscope and a magnetometer. The motion sensor(s) may further comprise sensor fusion software to combine gyroscope data and magnetometer data so as to provide a reference coordinate system for the gyroscope based on the Earth magnetic field measured by the magnetometer. In general, the sensor fusion software described above may combine measurement data acquired from at least two motion sensors such that measurement data acquired from one motion sensor is used to establish the reference coordinate system for the measurement data acquired from at least one other motion sensor.

The heart activity sensor(s) may comprise at least one electrical, optical and/or bioimpedance sensor to measure user's 102 heart activity. The electrical sensor(s) may be, for example, based on Electrocardiography (EKG) measurement. Further, besides these types of heart activity sensors, also other types of biosignal measurement sensors may be embedded into the heart activity circuitry. These types include but are not limited to the following: a Laser Doppler-based blood flow sensor, a magnetic blood flow sensor, an Electromechanical Film (EMFi) pulse sensor, a polarization blood flow sensor.

The positioning sensor(s) may comprise a GPS and/or a magnetometer, for example. Thus, the positioning may be based on, for example, GPS location. The magnetometer may provide direction data based on magnetic fields on Earth. Further, for indoor activities, indoor positioning circuitry may be used. One example of such indoor positioning system may be the use of magnetic fields inside a building and/or use of Bluetooth beacons for determining location.

While the users 102 are moving in the area 100 (i.e. field), their training devices 110 may collect predetermined sensor/exercise data with respect to the users 102, such as heart activity data, motion data, and/or location data. The collected data may be referred to as physical activity-related data.

In an embodiment, the training device 110 may process the physical activity-related data into physical activity-related information. Said information may be processed into a form which may be monitored more easily. For example, the physical activity-related data may comprise raw heart activity data which is then processed to represent heart rate of the user 102.

In an embodiment, a training device 110 may be in communication with a wrist device 112 worn by the user 102. For example, the wrist device 112 may be used by the user 102 to monitor the physical exercise of the user 102. The wrist device 112 may receive physical activity-related data and/or information from the training device 110 and/or perform measurements by itself. Thus, the wrist device 112 may comprise sensors, similar to the sensor comprised in the training device 110. The wrist device 112 may process the physical activity-related data into the physical activity-related information. The physical activity-related information may be further processed, for example, to enhance the presentation of the information.

In an embodiment, the training devices 110 comprise the wrist device 112.

In an embodiment, the training devices 110 comprise smart phone(s), mobile phone(s) and/or similar portable electronic device(s) which may be carried by the users 102. The function of the smart phone(s), mobile phone(s) and/or the similar portable electronic device(s) may be similar to the wrist device 112, that is monitoring personal physical activity-related information of the user 102.

Still referring to FIG. 1, the team sports monitoring system may comprise a portable electronic device 124, wherein the portable electronic device 124 may be a mobile phone, a smart phone, a palm device, a tablet computer, a laptop, a phablet or a portable digital assistant, for example.

In an embodiment, the portable electronic device 124 is an Ipad.

The portable electronic device 124 may be used to monitor physical activity-related information of the users 102. The portable electronic device 124 may receive physical activity-related data and/or information from the training devices 110. Further, the portable electronic device 124 may display the physical activity-related data and/or information for a coach, or supervisor of the team sport activity. This may enable the coach to monitor performance of the users 102.

The team sport monitoring system may further comprise a docking station 122 comprising connection members for the training devices 110 and the portable electronic device 124, wherein the connection members may enable recharging of said devices, and data transmission between the docking station 122 and said devices. The connection members may utilize Universal Serial Bus (USB) connection for the recharging and/or data transmission, for example.

The area 100, shown in FIG. 1, may comprise sub-areas 108, which may be used to gather area-specific information. That is, the training devices 110 and/or the portable electronic device 124 may be aware of the areas 108, and use this area information when processing the physical activity-related data and/or information. Further, sports equipment, such as a football 104, may comprise sensor(s). These sensor(s) may be similar to the sensor(s) used with the training device 110. Naturally, heart activity sensor may be not applicable with the sports equipment, but position information may be useful. For example, it may be possible to determine speed of the ball, or position of the ball in relation to time. This information may be quite valuable to the coaching team.

Further, the team sport monitoring system may comprise a network 130 comprising a database 132 (i.e. training database) and/or a server 134. The network 130 may be used to store physical activity-related data and/or information and/or to enable access to said data and/or information from an external source. The external source may mean, for example, web-based tool for monitoring data and/or information after or during the physical activity.

In an embodiment, the portable electronic device 124 transmits the physical activity-related data/or information to the network. This may be achieved using a Wireless Local Area Network (WLAN) circuitry and/or cellular circuitry, for example.

In an embodiment, the docking station 122 is connected to the network 130. Thus, data may be transmitted between the docking station 122 and the network 130.

In an embodiment, the physical activity-related information comprises the physical activity-related data. Therefore, physical activity-related information may comprise raw measurement data and/or processed data.

Still referring to FIG. 1, the training devices 110 and the portable electronic device 124 may comprise one or more communication circuitries enabling wireless communication between devices. The communication circuitries may utilize at least one of the following communication technologies/ protocols: Bluetooth, Bluetooth Low Energy (BLE) (i.e. Bluetooth Smart), WLAN, ANT or ANT+ by Dynastream, Near Field Communication (NFC), or IEEE 802.15.4. Other device-to-device communication protocols are equally possible.

The number of users 102 may increase data transfer between the training devices 110 and the portable electronic device 124. Device-to-device communication between said devices may be cumbersome, as the number of device-to-device communication links may be limited in used communication technology. Especially, as the portable electronic device 124 may receive data from a plurality of training devices 110, the effectiveness of the data transfer may be an important factor for the performance of the team sport monitoring system.

Figure 2:
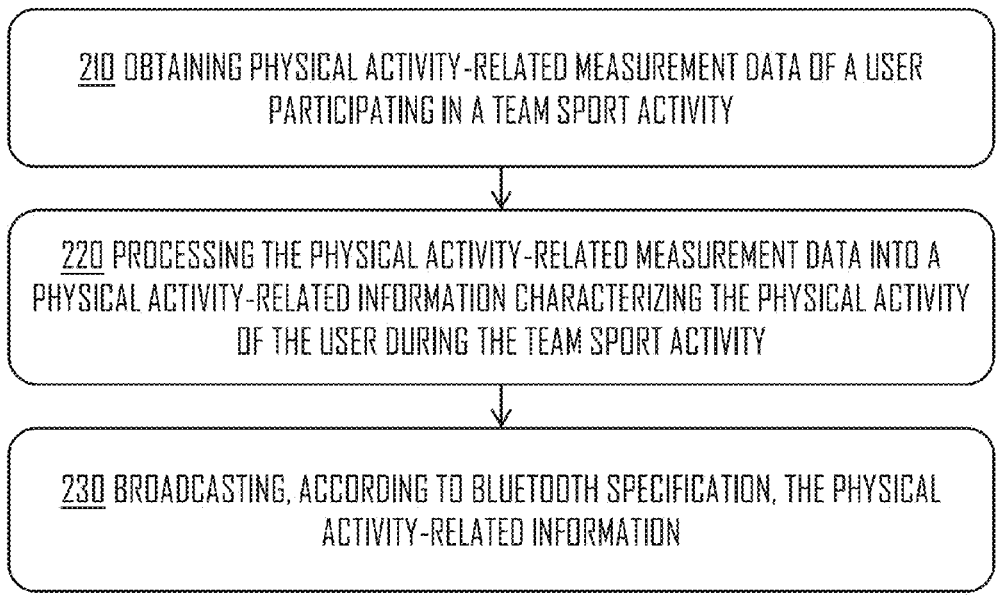
FIGS. 2 to 3 illustrate block diagrams according to some embodiments of the invention.

FIG. 2 illustrates a block diagram according to an embodiment of the invention. Referring to FIG. 2, in step 210, the training device 110, which may be one of a plurality of training devices shown in FIG. 1, may obtain physical activity-related measurement data of the user 102 participating in a team sport activity. The obtaining may comprise measuring said data and/or receiving said data from some other source. For example, the wrist device 112 may receive said data from a sensor device, such as the training device 110.

In step 220, the training device 110 may process the physical activity-related measurement data into physical activity-related information characterizing the physical activity of the user during the team sport activity. This may comprise processing raw measurement data, such as heart activity data, motion data and/or location data, into physical activity-related information. One example may be processing GPS data into actual locations shown, for example, in a form of a field map, or using GPS data and time measurement to reveal velocity of the user 102.

In an embodiment, the physical activity-related information comprises at least one of the following with respect to the user 102 carrying the respective training device 110: heart activity, motion intensity, elapsed distance, speed, velocity, accumulated impacts, acceleration, propagation direction, consumed calories, consumed fat, pace, stride, skin temperature, running index, training load, core temperature. Thus, the physical activity-related measurement data may be used to reveal the above-described physical-activity related metrics.

In step 230, the training device 110 may broadcast, according to the Bluetooth specification, the physical activity-related information. The broadcasting may, in general, mean that the training device 110 transmits data to a plurality of receivers. More particularly, all receivers, on the area on which the broadcasting is detectable, may receive the broadcasted data.

Broadcasting the physical activity-related information, according to the Bluetooth standard, may enhance the performance of the system. For example, the number of device-to-device communication links may be decreased as there may not be a need to establish connection between a plurality of training devices 110 and the portable electronic device 124 for data transfer. As the plurality of training devices 110 may broadcast the data, it may mean that the portable electronic device 124 listens on certain frequencies, detects broadcasted data and receives the broadcasted data. This may enable the portable electronic device 124 to handle more data inputs, as there may not be a need to establish the device-to-device communication link for the data transfer.

As a consequence, the portable electronic device 124 may be used to monitor a large number of users participating in the team sport activity.

In an embodiment, the training device 110 comprises a communication circuitry configured to communicate according to the Bluetooth specification, at least one processor, and at least one memory including a computer program code, wherein the at least one memory and the computer program code are configured, with the at least one processor, to cause the device to perform steps 210, 220, 230 of FIG. 2. Therefore, for example, the broadcasting may be performed using the communication circuitry.

In an embodiment, the training device 110 is one of a plurality of training devices, wherein the broadcasting, by the training device 110, further comprises broadcasting an identifier, and wherein the identifier is unique to the training device 110 among the plurality of training devices. The identifier may be used identify the training device 110 among the plurality of training devices. Thus, the receiver may know from which training device the broadcasted data is from. In an embodiment, the identifier is a Globally Unique Identifier (GUID). This may mean that the identifier is unique among the other identifiers used by the plurality of training devices. Further, it may be possible to preset the identifier to the training device 110, when the training device 110 is connected to the docking station 122, for example. In an embodiment, the identifier comprises user information, such as player number and/or initials of the user 102, to name a few examples.

Figure 3:
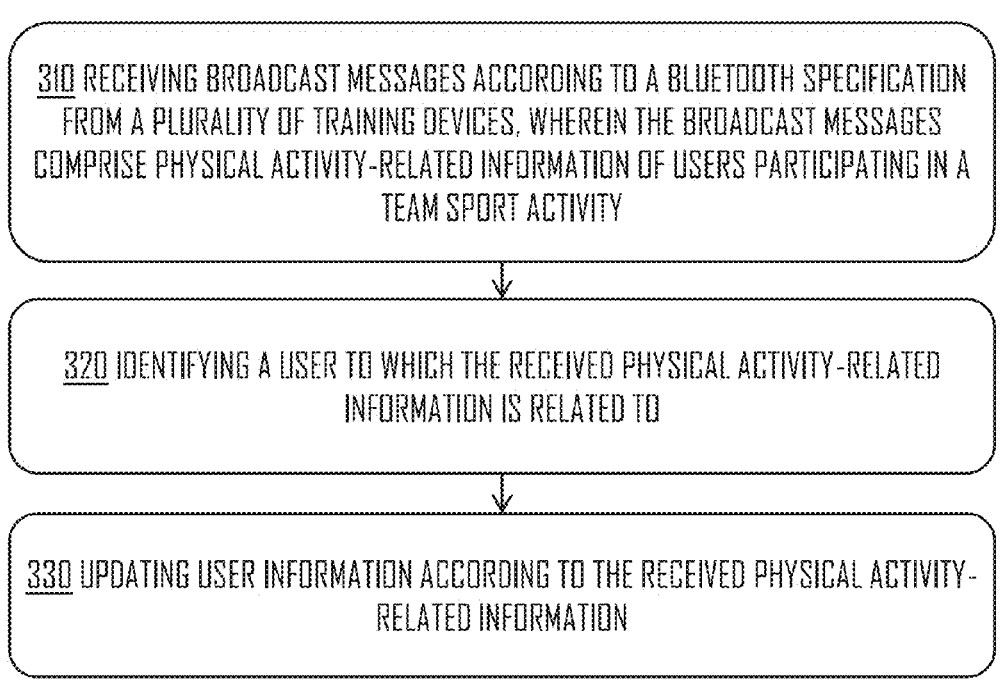

FIG. 3 illustrates a block diagram according to an embodiment of the invention. Referring to FIG. 3, in step 310, the portable electronic device 124 may receive broadcast messages, according to Bluetooth specification, from a plurality of training devices 110, wherein the broadcast messages comprise physical activity-related information of the users 102 participating in the team sport activity. Step 310 may correspond to the step 230 of FIG. 2, wherein the training device(s) 110 may broadcast data.

As described earlier, broadcasting, by the training devices 110, may not be directed to any receiver. However, the portable electronic device 124 may be on a scanning mode, according to the Bluetooth standard, and detect broadcasted messages. In other words, the portable electronic device 124 may scan for broadcasters in proximity of the portable electronic device 124, detect the broadcasted signals, and receive the broadcasted data from the training devices 110.

In step 320, the portable electronic device 110 may identify the user 102 to which the received physical activity-related information, received in step 310, is related to. Basically, this means that the received physical-activity related information is associated to the user 102, wherein the user 102 may be one of the users 102. The physical activity-related information may be received from the plurality of training devices 110, wherein each of the plurality of training devices 110 corresponds to one of the users 102. It is also possible, that more than one training device 110 corresponds to the one of the users 102.

In an embodiment, the physical activity-related information corresponds to two or more users 102. This may be the case, if the training devices 110 are used to collect data from a plurality of users 102.

In step 330, the portable electronic device 124 may update physical activity-related information of the user 102 according to the received physical activity-related information. This may mean that the portable electronic device 124 and/or the network 130 are used to store the physical activity-related information of the users 102, and this stored information may be updated as the team sport activity advances. Naturally, it may be possible to store data from a longer period than just one training event, and thus the stored physical activity-related information may comprise training history of the users 102. As the portable electronic device 124 may be in communication with the network 130, the data may be stored also in the network 130, enabling access and/or storing of a massive amount of data.

In an embodiment, a computer-readable storage medium comprising a computer program comprising computer program code which, when loaded into the portable electronic device 124 cause the device to perform operations comprising: receiving broadcast messages, according to Bluetooth specification, from a plurality of training devices, wherein the broadcast messages comprise physical activity-related information of users participating in a team sport activity, identifying a user to which the received physical activity-related information is related to, and updating physical activity-related information of the user according to the received physical activity-related information. Thus, the portable electronic device 124 may perform steps 310, 320, 330 of FIG. 3. In an embodiment, the computer-readable storage medium is a non-transitory computer-readable storage medium.

In an embodiment, there is provided a system for monitoring the team sport activity, the system comprising: the plurality of training devices 110, wherein the plurality of training devices 110 comprise the communication circuitry configured to communicate according to Bluetooth specification, the portable electronic device 124 comprising communication circuitry configured to communicate according to Bluetooth specification, and the docking station 122 comprising connection members for the plurality of training devices 110 and the portable electronic device 124, wherein the connection members enable recharging of said devices, and data transmission between the docking station and said devices, wherein the plurality of training devices 110 are configured to obtain the physical activity-related measurement data of the users 102 participating in the team sport activity, to process the physical activity-related measurement data into the physical activity-related information characterizing the physical activity of the users 102 during the team sport activity, and to broadcast the physical activity-related information, and wherein the portable electronic device 124 is configured to receive at least some of the broadcasted information. Said system may be illustrated in FIG. 1. As described in relation to FIG. 1, the system (e.g. team sport monitoring system) may comprise the network 130 to provide more functions to said system.

Figure 4A:
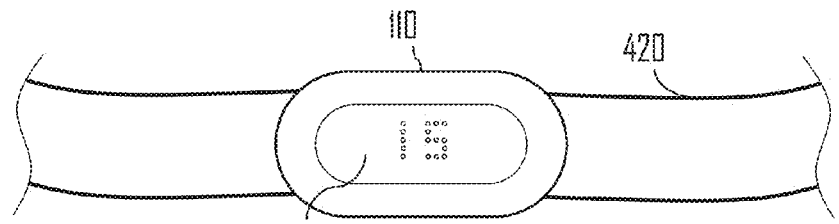
FIGS. 4A to 4C illustrate some embodiments of the invention.
Figure 4B:
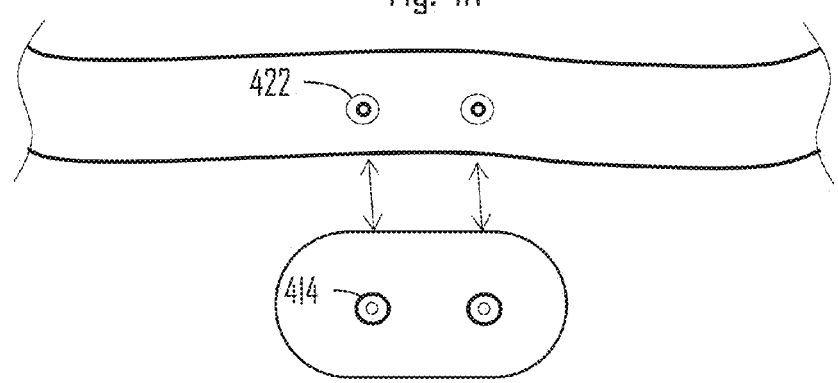
Figure 4C:
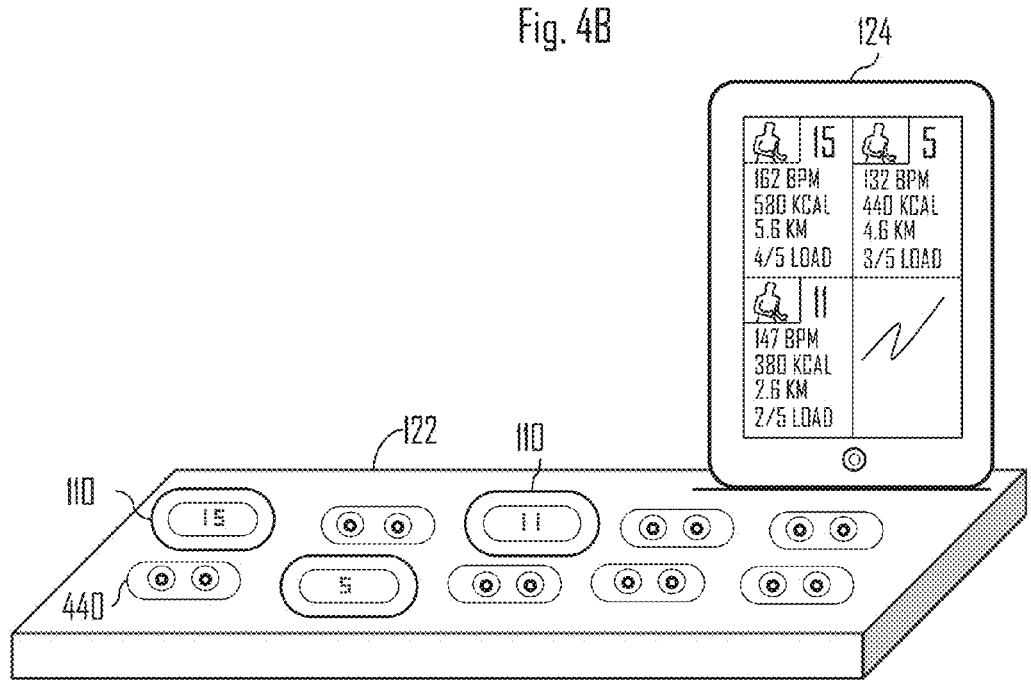

Let us now look some embodiments of the system, and devices of the system. FIGS. 4A to 4C illustrate some embodiments. Referring to FIG. 4A, the training device 110 may comprise a user interface 412. The user interface 412 may enable interaction between the user 102 and the training device 110. The user interface may comprise a display and/or buttons. The display may comprise a plurality of light emitting diodes (LED). It may be possible to use a touch screen component with the display, wherein the buttons may be comprised in the touch screen. The display may be used to display information to the user 102. For example, a player number and/or player initials may be indicated on the display. This may be beneficial, for example, if the training devices 110 are placed on and/or connected with the docking station 122, as different users (e.g. players) may more easily select their corresponding training device 110. Thus, the identification of the training devices 110 may become easier.

The training device 110 may comprise and/or be connected to a strap 420. The strap 420 may be a wrist and/or a chest strap, for example. With the help of the strap 420, the training device 110 may be attached to the user 102. Referring to FIG. 4B, the strap 420 may comprise one or more members 422 that correspond to one or more connection members 414 of the training device 110. The connection members 422, 414 may enable electrical connection between the strap 420 and the training device 110. For example, the strap 420 may comprise connection area(s) for EKG measurement, wherein the training device 110 may be used for the EKG measurement. Further, the connection members 422, 414 may enable the training device 110 to be mechanically connected to the strap 420. The connection members 422, 414 may comprise material that is electrically conductive. The strap 420 may be used to attach the training device 110 on the user's 102 waist, arm, head and leg to mention a few examples.

In an embodiment, the strap 420 is and/or comprises an attachment band.

In an embodiment, the connection members 422, 414 are snap fasteners. In such case, the connection members 422, 414 may comprise male and female side parts accordingly.

In an embodiment, the training device 110 displays player identification, such as the player number, on the user interface 412 when the one or more connection members 414 are connected to the one or more connection members 422.

In an embodiment, the training device 110 displays player identification on the user interface 412 when the one or more connection members 414 are connected to the corresponding one or more connection members on docking station.

In an embodiment, the training device 110 displays player identification on the user interface 412 when the one or more connection members 414 are electrically connected together. For example, the one or more connection members may be short-circuited. The short-circuiting in this case may mean, for example, that the user 102 puts a finger on the one or more connection members 414. For example, if there are two connection members 414, the user may use on of his and/or her fingers to short-circuit the two connection members 414. Naturally, this may not precisely mean short-circuiting as there may be some resistance in the finger of the user 102.

In an embodiment, the training device 110 detects a user input, such as the electrical connection between the connection members 414 or pressing of a button of the user interface 412, and as a response to the detecting, displays an identification, wherein the identification is characteristics to the user 102 of the training device 110. As mentioned above, the identification may comprise player number, for example. Other examples may comprise name or position of the user 102 in the team sport activity, such as attacker, defender, or quarterback, to name a few examples. The using position on the field as an indicator may enable to use the same training device 110 by multiple users 102 with similar roles in the team sport activity.

Referring to FIG. 4C, the docking station 122 may comprise connection members 440 for the plurality of training devices 110. As described earlier, the connection members 440 may enable energy transfer from the docking station to the training devices 110. For example, the docking station 122 may be connected to an electrical network and may recharge the training devices 110 when they are connected to the connection members 440. The recharging may happen wirelessly and/or with wired connection. One example of wireless recharging may be to induce current to a coil comprised in the training device 110.

The docking station 122 may further comprise connection member(s) for at least one portable electronic device, such as the portable electronic device 124. The connection member(s) for the at least one portable electronic device may enable recharging of the at least one portable electronic device and/or data transfer between the docking station and the at least one portable electronic device 124.

In an embodiment, the connection members 440 comprise counterparts for the connection members 414 of the training devices 110. Thus, the connection members 440 may be similar to that of connection members 422 of strap 420.

In an embodiment, the connection members of the docking station enable direct data transfer between the portable electronic device 124 and the training devices 110.

In an embodiment, the connection members 440 enable direct wireless data transfer between the docking station 122 and the training devices 110. For example, Bluetooth and/or NFC may be used to transfer data between the training devices 110 and the docking station 122.

In an embodiment, the training device 110 detects that the training device 110 is connected to the docking station 122, wherein the connection enables information transfer between the training device 110 and the docking station 122, and recharging the battery of the training device 110. The connection may be enabled by the connection members 414, 440, for example. In an embodiment, said connection enables data transfer between the training device 110 and the docking station 122. In another embodiment, said connection enables recharging of the training device 110.

In an embodiment, the training device 110 stores the physical activity-related information for later use. The training device 110 may comprise at least one memory unit, which may be used for the storing. The training device 110 may detect when the training device 110 is connected to the docking station 122, and after the detecting transfer stored physical activity-related information to the portable electronic device 124. The training device 110 may, for example, broadcast some of the physical activity-related information during the team sport activity. After the team sport activity, the users 102 may return said devices to the docking station 122. The training devices 110 may then determine that they are connected wirelessly and/or with wire to the docking station, and transmit more physical activity-related information to the portable electronic device 124. When, for example, the USB connection is used, the data transfer between the training devices 110 and the portable electronic device 124 may be quite fast.

In an embodiment, after detecting that the training device 110 is connected to the docking station, receiving, by the training device 110, a software update from the portable electronic device 110. Thus, for example, USB connection between the training device 110 and the docking station 122, and the USB connection between the portable electronic device 124 and the docking station 122 may be used to transmit the software update. The training device 110 may update the software after the software update is received. Besides software updates, the training device 110 may receive configuration information concerning processing the physical activity-related data into the physical activity-related information. Such configuration information may comprise user characteristics which may be inputted from the portable electronic device 124 and/or from the network.

Still referring to FIG. 4C, the portable electronic device 124 may display the physical activity-related information of the users 102. The physical activity-related information may comprise user time on heart rate zones, travelled distance on speed zones by the user, travelled overall distance, cadence information of the user, number of accelerations by the user, position information of the user, training load of the user, calories burnt by the user, core temperature of the user and/or recovery time of the user.

The training load may illustrate how exhaustive the exercise has been for the user 102. For example, the training load may be illustrated with a number ranging from number 1 to number 5, wherein number 5 may correspond to highest training load. The training load may depend on user characteristics, such as overall fitness, age, and weight, to name a few examples.

The recovery time may illustrate how long the user 102 should rest to recover from the team sport activity. To determine the recovery time, user training history may be used together with the physical activity-related information of the current team sport activity. For example, if the user 102 has run 10 kilometers, the recovery time may be longer compared to a user that has run only 3 kilometers. This information may be beneficial for the coaching team when planning future activities for the users 102.

The number of accelerations may indicate the number of accelerations, wherein the user's 102 acceleration has been over 3 meters per second. Further, for the acceleration to be counted more than 3 steps may need to be taken and/or the acceleration may need to last at least two seconds.

In an embodiment, the training device 110 comprises user specific configuration information, wherein the physical activity-related measurement data is processed into the physical activity-related information based, at least partly, on the user specific configuration information. As said earlier, this configuration information may be received from the portable electronic device 124 and/or the network 130. The user specific configuration information may comprise at least one physical attribute of the user 102. These physical attributes may comprise gender, age, height, weight, maximum heart rate, resting heart rate, and heart rate response to activity, to name a few.

In an embodiment, the training device 110 comprises at least one sensor configured to measure at least some of the physical activity-related data.

In an embodiment, the at least one sensor comprises a heart activity sensor and/or a motion sensor, described in relation to FIG. 1. The heart activity sensor may be used to measure heart rate of the user, for example. Thus, the user time on heart rate zones may be determined. Data provided by the motion sensor may be used to determine travelled distance on speed zones, travelled overall distance, number of accelerations to name a few. Naturally positioning sensor(s), such as GPS sensor, may be used also for distance determination, and further to determine position of the user. Determination of training load of the user, calories burnt by the user and/or the recovery time of the user may be achieved, for example, by the training device 110 using the at least one sensor data. Thus, data from one or more source for the determination may be used.

In an embodiment, the portable electronic device 124 determines at least one of training load, calories burnt, recovery time of the user by using the data from the at least one sensor. Thus, for example, the training device 110 may broadcast heart activity information, motion information, position information and/or cadence information. The portable electronic device 124 may receive said data, and use said data as a basis for the determination.

In an embodiment, the training device 110 comprises a measurement unit for determining core temperature of the user. Such measurement unit may comprise, for example, a thermometer.

In an embodiment, the training device 110 comprises a cadence sensor for determining cadence of the user.

Figure 5A:
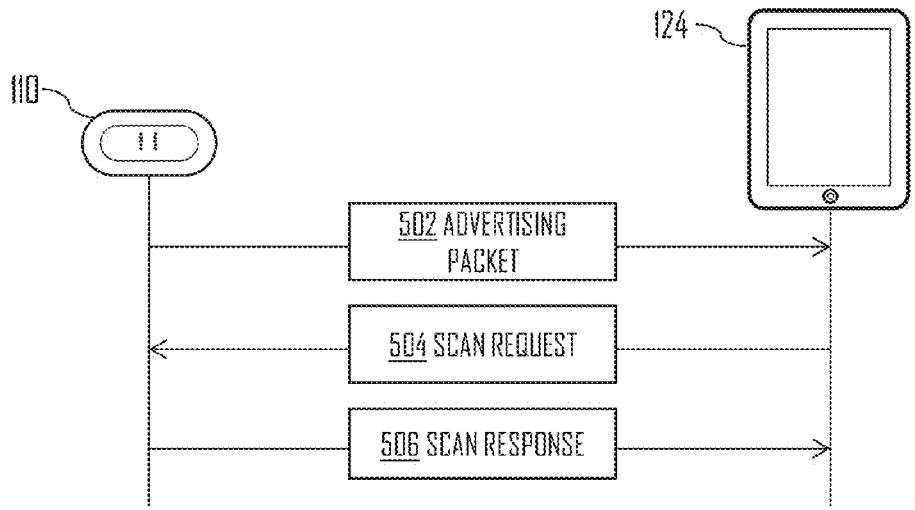
FIGS. 5A to 5E illustrate some embodiments of the invention.

Let us now take a closer look on the broadcasting of the physical activity-related information looking at examples of FIGS. 5A to 5E. Referring to FIG. 5A, the broadcasting, of step 230 of FIG. 2, may comprise blocks 502, 504, 506 of FIG. 5A. In block 502, the training device 110 may broadcast, on a first interval, an advertising packet for a predetermined time. The portable electronic device 124 may detect and/or receive at least one advertising packet from the plurality of training devices 110. In the example of FIG. 5A, the portable electronic device 124 may receive the advertising packet from the training device 110. It needs to be noted that not all advertising packets broadcasted by the plurality of training devices 110 are necessarily received. The portable electronic device may need to be in scanning mode, according to the Bluetooth standard, before the detection and/or receiving is enabled. The advertising packets may be broadcasted on advertising frequencies and/or channels of the Bluetooth specification.

In block 504, the portable electronic device 124 may respond to the at least one advertising packet with at least one scan request. That is, the portable electronic device 124 may respond to the received advertising packet broadcasted by the training device 110. The training device 110 may receive the scan request from a portable electronic device 124. The scan request may be received during broadcasting of the advertising packet. This may happen, as the training device 110 may not necessarily be aware of the receiving of the advertising packet by the portable electronic device 124.

In an embodiment, the scanning performed by the portable electronic device 124 is active scanning of the Bluetooth specification. During the active scanning, the portable electronic device 124 may detect the advertising packet and respond with the scanning request if necessary.

In block 506, the training device may broadcast a scan response comprising at least some of the physical activity-related information. Accordingly, the portable electronic device 124 may receive the scan response from the training device comprising at least some of the physical activity-related information of the user 102. The scan response may be a similar data packet compared to the advertising packet, but may comprise more space for actual payload data.

It needs to be noted that the portable electronic device 124 may handle a plurality of described broadcasting processes from the plurality of training devices 110. The advertising packet may comprise a device identification which may be used to identify the training device 110, and further the user 102 of the training device. Thus, the portable electronic device 124 may be able to receive data from the plurality of training devices 110.

In an embodiment, the broadcasting of the advertising packet is fast advertisement, wherein the first interval is around 30 milliseconds. Some other interval lengths may be also used, and as described later, the interval may change dynamically. Dynamic changing may be caused by different triggers.

Still referring to FIG. 5A, the advertising packet broadcasted in block 502, and/or the scan response broadcasted in block 506, may comprise up to 47 bytes, wherein each byte may comprise 8 bits. As bytes may be needed for configuration, such as preamble and access address, less bytes may be used for the actual payload, which may be used to broadcast the physical activity-related information. The payload length may be, for example, 27 bytes for the scan response. For the advertising packet, the payload length may be shorter, at least in some cases, as more bytes are required to advertise different services. For example, payload length for the advertising packet may be 10 bytes.

Figure 5B:
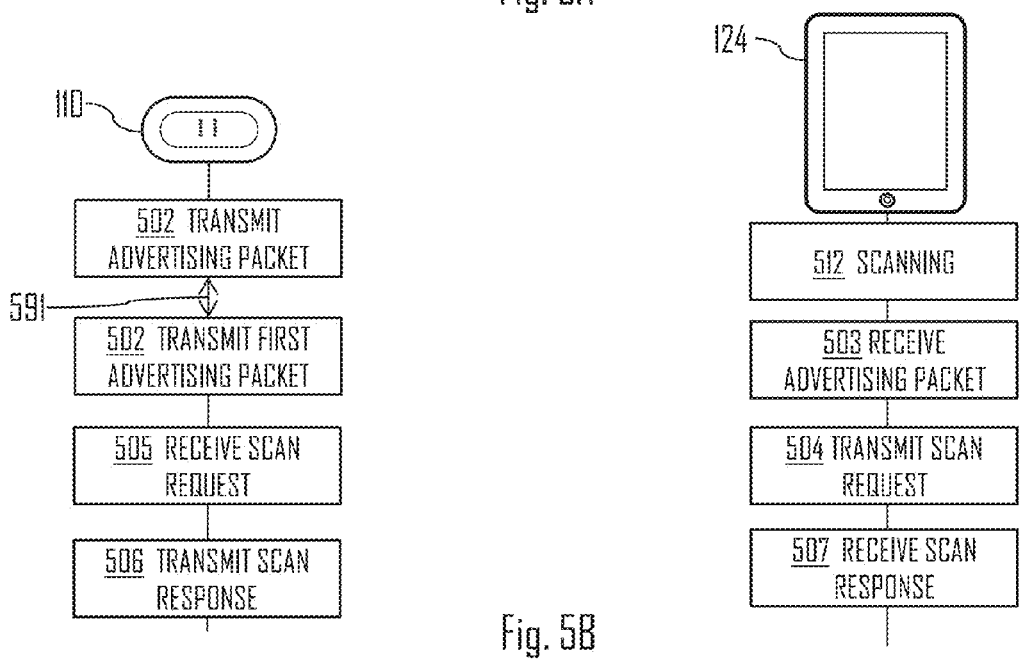

Referring to FIG. 5B, the training device 110 may broadcast the advertising packet more than once on the first interval (block 502). The first interval may be indicated in FIG. 5B, with an arrow 591. The portable electronic device 124 may be in the scanning mode (block 512), when the portable electronic device 124 receives the broadcasted advertising packet (block 503). The portable electronic device 504 may then transmit and/or broadcast the scan request (block 504). The training device 110 may receive the scan request in block 505, and as a response, broadcast the scan response (block 506). The portable electronic device 124 may receive the scan response in block 507.

In an embodiment, the advertising packet comprises at least some of the physical activity-related information of the user 102. Thus, the advertising packet of the Bluetooth specification may be used to broadcast actual data of the team sport activity. This may enhance the performance of the team sport monitoring system by reducing the amount of packets to be broadcasted. As the advertising packet may be necessary to broadcast in order to acquire information about the available devices, the broadcasting may be then used more efficiently.

Figure 5C:
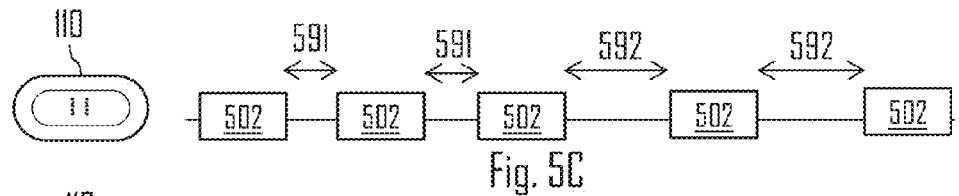

Referring to FIG. 5C, the training device 110 may broadcast the advertising packet (block 502) on the first interval 591 for a predetermined time. After the predetermined time, the training device may broadcast the advertising packet on a second interval 592, wherein the second interval 592 may be longer compared to the first interval 591. Thus, the advertising packet broadcasting may be less intense. The longer interval may save Bluetooth radio resources on the advertising channel, and thus enhance the performance of the team sport monitoring system. The starting of the predetermined time may be triggered by the training device 110 detecting a connection to the user 102, for example. The training device 110 may detect the connection from resistance, for example.

In an embodiment, the predetermined time is around 300 milliseconds.

Figure 5D:
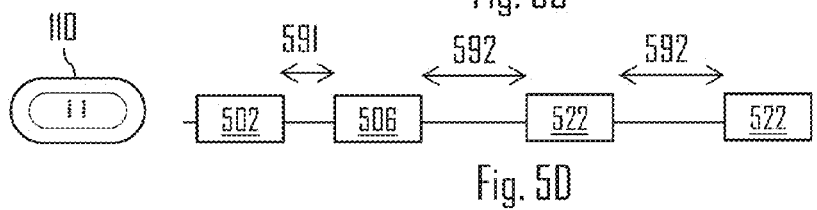

The training device 110 may broadcast different advertising packets. Referring to FIG. 5D, the training device 110 may first broadcast advertising packet (block 502) on the first interval 591. The training device 110 may then receive the scan request, and broadcast the scan response (block 506). Receiving of the scan request and/or broadcasting the scan response, may trigger the training device 110 to change the broadcasting interval to the second interval 592. Further, the contents of the advertising packet may be changed at the same time, and the training device 110 may broadcast a second advertising packet (block 522). For example, the second advertising packet may comprise information about the next physical activity-related information that the training device wants to broadcast. Further, the second advertising packet may comprise at least some of the physical activity-related information, and thus the contents may be different compared to the advertising packet broadcasted in block 502.

Figure 5E:
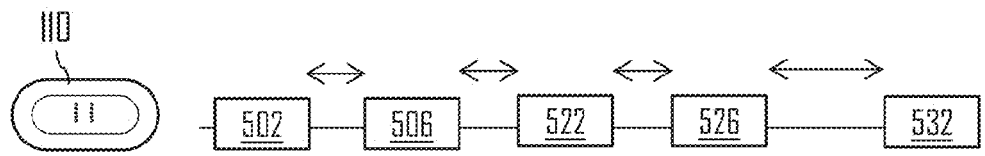

Referring to FIG. 5E, the training device 110 may change the broadcasting interval after the predetermined time if the scan request is received, and the scan response is broadcasted (block 506). Thus, it may be possible that the broadcasting interval is changed after the predetermined time has passed and/or if the scan request is received.

In an embodiment, the training device 110 broadcasts the advertising packet (block 502) for the predetermined time. After the predetermined time has passed the training device 110 starts to broadcast the second advertising packet. The advertising packet broadcasted in block 502 may comprise connection information for the wrist device 112 of the user 102. Using this information, a communication link between the training device 110 and the wrist device 110 may be established.

In an embodiment, after the predetermined time, the training device 110 stops advertising connection service to the wrist device 112. This may save advertising channel resources.

In an embodiment, the training device establishes a data transfer connection to the wrist device 112, and transmits at least some of the physical activity-related information to the wrist device 112. The data transfer connection may be a normal Bluetooth device-to-device connection, for example. The training device 110 may advertise connection to the wrist device 112 during the predetermined time, for example.

In an embodiment, the training device 110 broadcasts the advertising packet comprising connection service to the wrist device 112 for the predetermined time and/or after the connection is established to the wrist device 112. After the predetermined time and/or after the connection is established to the wrist device 112, the training device 110 may stop advertising services to the wrist device, and only broadcasts advertising packet for the purpose of transferring physical activity-related information from the training device 110 to the portable electronic device 124.

In an embodiment, payload length for the advertising packet, such as the advertising packet broadcasted in block 502, may be 27 bytes after the predetermined time has passed and/or after the connection is established to the wrist device 112. Thus, during the advertising of services to the wrist device 112, the payload length for the advertising packet may be shorter, such as the 10 bytes mentioned above. More space for the payload may mean that the advertising packet may be more efficiently used to broadcast the physical activity-related information.

Figure 6:
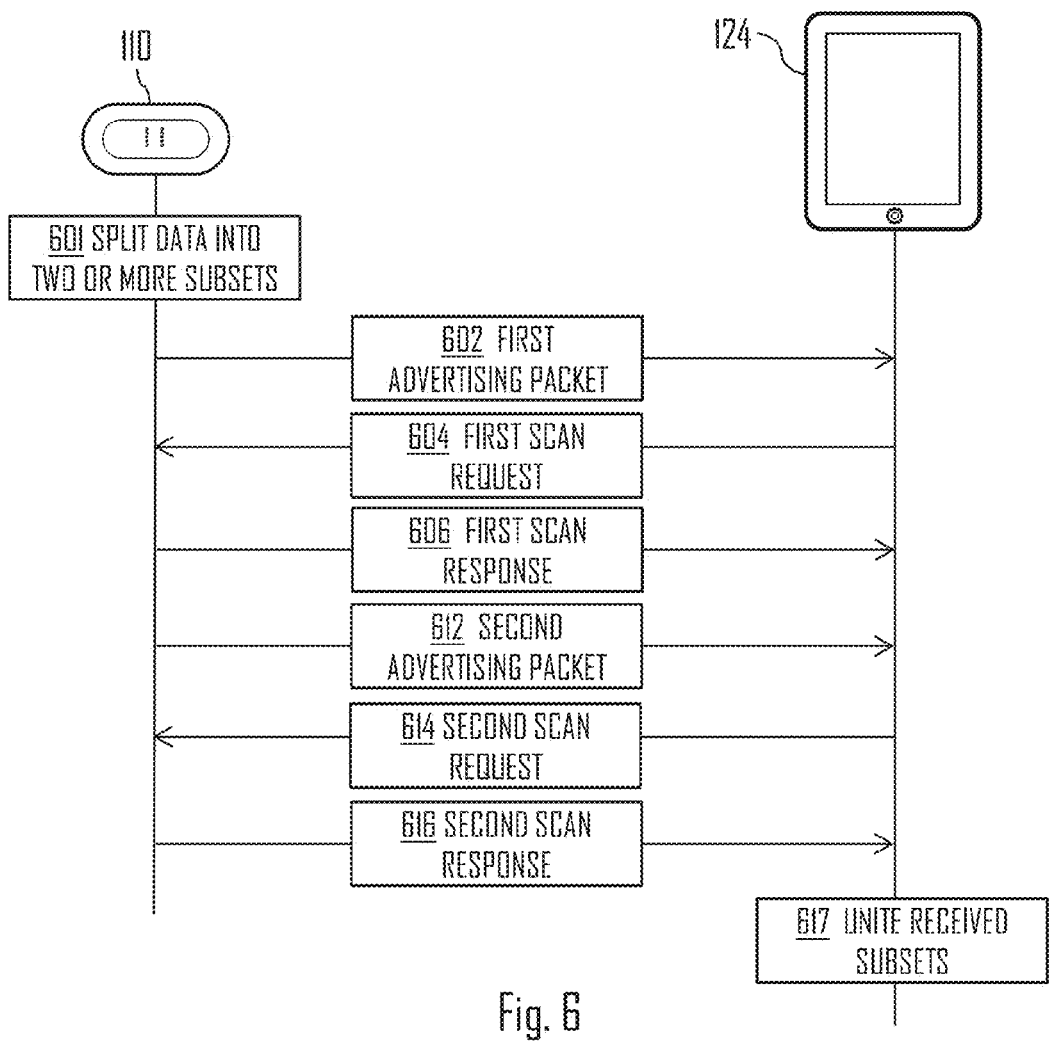
FIG. 6 illustrates an embodiment of the invention.

FIG. 6 illustrates an embodiment of the invention. Referring to FIG. 6, the training device 110 may prepare the physical activity-related information for broadcasting, according to the Bluetooth standard, by splitting the physical activity-related information into two or more sub-sets (block 601). The training device 110 may add an indicator for each of the sub-sets indicating that the two or more sub-sets are sub-sets of the physical activity-related information. This may mean that the training device 110 wants to broadcast some entity of the physical activity-related information, splits said entity into sub-sets, and indicates in the sub-sets that the sub-sets are sub-sets of said entity. The training device 110 may broadcast, according to the Bluetooth specification, the two or more sub-sets using a separate data packet for each of the two or more sub-sets.

Accordingly, the portable electronic device 124 may receive the two or more data packets, wherein the two or more data packets comprise an indicator indicating that the two or more data packets are sub-sets of the physical activity-related information, and unite the two or more data packets, based on the indicator of the two or more data packets (block 617).

Similar to the broadcasting described in relation to FIG. 5A, the two or more data packets may be broadcasted according to the Bluetooth specification. For example, the two or more data packets may be broadcasted using a first advertising packet (block 602), a first scan response (block 606), a second advertising packet (block 612) and/or a second scan response (block 616). Naturally, the portable electronic device 124 may broadcast and/or transmit a first and a second scan requests (blocks 604, 614) in order to cause the training device 110 to broadcast the corresponding scan responses.

In an embodiment, each of the two or more data packets comprises 25 bytes of physical activity-related information. When the data packets are formed by splitting the physical activity-related information (block 601), the training device 110 may add the indicator to each of the two or more data packets so that the receiver (e.g. portable electronic device 124) may know which data packets need to be united. The indication may be done using, for example, 2 bytes long identifier. Thus, each of the two or more data packets comprises 27 bytes of data. This payload data (e.g. 27 bytes) may be broadcasted using the advertising packets and/or scan responses. More precisely, the two or more data packets may be broadcasted with the payload of the advertising packets and/or scan responses. The two or more data packets may be formed so that the data is in binary string form. Further, Google Protocol Buffer (GPB)-methods may be used when forming the data into the binary string form, or more precisely, into fixed binary string form. Naturally, similar methods may be used at the receiver, although inverse, at the receiver (e.g. the portable electronic device 124), so that the receiver may acquire the broadcasted physical activity-related information in desired form.

In an embodiment, the training device 110 updates different values of the physical activity-related information with different intervals. For example, heart rate, speed, location and/or heading may be updated using 1 second long interval. On the other hand, less time crucial values, such as time in heart rate zones, may be update less frequently. For example, 2 second long interval may be used for the less time crucial values. This may reduce the amount of data to be broadcasted, and thus enhance the performance of the team sport monitoring system.

In an embodiment, the training device 110 forms data blocks from the physical activity-related information, wherein the data blocks are broadcasted, according to the Bluetooth specification, to the portable electronic device 110. Using the example of FIG. 6, one data block may be broadcasted, for example, using the first and second scan responses, wherein the scan responses are broadcasted using a first interval. The first interval may be, for example, 1 second long. The first scan response may comprise all of the time crucial values, and some of the less time crucial values. The second scan response may comprise all of the time crucial values, and the rest of the less time crucial values. Thus, the time crucial values may be broadcasted more frequently, as they may be updated also more frequently, compared to the less time crucial values.

It may also be possible that more than two scan responses are used for the broadcasting. For example, the physical activity-related information may be split into 4 categories, wherein a first category may be updated using a first interval, wherein a second category may be updated using a second interval, wherein a third category may be updated using the second interval, and wherein a fourth category may be updated using a fourth interval. The first interval may be 1 second, the second interval may be 2 seconds, and the fourth interval may be 4 seconds, for example. Now the physical activity-related information, or more precisely the data blocks, may be broadcasted using four scan responses, wherein all of the scan responses comprise the first category information, even scan responses comprise second category information, odd packets comprise the third category information, and wherein the fourth category information is split so that the physical activity-related information comprised in the fourth category is divided into the four scan responses. It is also possible that the first and the second advertising packets are used for the data broadcasting, which may enable data to be broadcasted more frequently and/or more efficiently.

In an embodiment, the physical activity-related information comprises around 100 bytes long data blocks. These data blocks are split, by the training device 110, into 4 data packets each comprising 25 bytes of data, and broadcasted to the portable electronic device 124 using the methods described above.

In an embodiment, the two or more data packets are broadcasted using 1 second long interval.

In an embodiment, the two or more data packets are encrypted by the training device 110. For example, a 16 bytes long encryption may be used. If the data packets are 25 and/or 27 bytes long, the most sensitive bytes may be hashed. For example, identification and/or identifier, such as MAC address, may be beneficial to encrypt. Another example may be to leave the identification unencrypted as it may help the portable electronic device 124 to be selective of the received information as the source of the broadcasting may be known.

In an embodiment, the advertising packet, such as the advertising packet broadcasted in block 502 of FIG. 5A, comprises device identifier. This may enable the use of privacy mode, according to the Bluetooth specification. In privacy mode, the physical address of the training device 110 may change cyclically which may mean that the training device 110 may not be tracked, by the portable electronic device 110 for very long time. Using the device identifier in the advertising packet and/or in the scan response may help the portable electronic device 124 to know from which training device 110 the broadcasted data originates from.

FIGS. 7A to 7E illustrate some embodiments of the invention. The portable electronic device 124 may be used to illustrate the physical activity-related information of the users 102 which may be updated based on the received broadcasted data from the plurality of training devices 110. Further, it may be possible to calculate and/or determine, by the portable electronic device, a collective physical activity-related value for a group of users. For example, a team load value illustrated in FIG. 7A may be a collective value calculated from a plurality of training load values of the users 102.

Referring to FIG. 7A, the portable electronic device 124 may change displaying of data from a vertical view 702 to horizontal view 704 when the portable electronic device 124 is rotated. This may enable the portable electronic device 124 to view the physical activity-related data in different forms, and for example, enable the coach to monitor more users 102 in one view. Naturally, space on the display may not get any bigger, but the data may be illustrated in different form.

The portable electronic device 124 may indicate 706, 708 a single user and/or a group of users on the display. The indication may relate to, for example, some value of the physical activity-related information going over a certain threshold. In the example of FIG. 7A, the portable electronic device 124 indicates 706 that a player named Andersen has gone over some threshold, and may need some special attention. The portable electronic device 124 further indicates 708 that the team load is in acceptable level.

Referring to FIG. 7B, in step 710, the portable electronic device 124 may determine that a value of the physical activity-related information of at least one user of the users 102 is over a first threshold. For example, training load is over number 4 and/or value of burned calories is over 600 kcal.

In step 720, the portable electronic device 124 may associate a first marker, such as the indication 706, to the physical activity-related information of the at least one user indicating the exceeding of the first threshold. For example, the first marker may show generally that the at least one user needs some special attention. The coach may then open details of that specific at least one user, and see to what value of the physical activity-related information of the at least one user the first marker is related to.

Figure 7D:
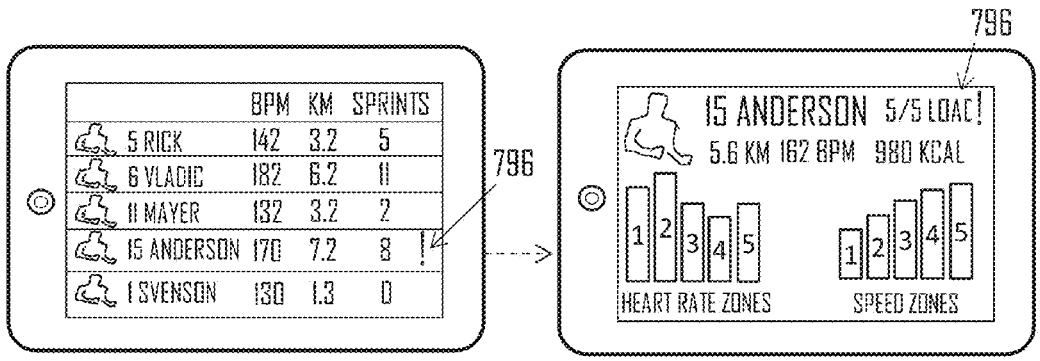

In the example of FIG. 7D, the first marker 796 is shown relating to the player Anderson. The portable electronic device 124 may detect the first marker 796, and perform an analysis on said player. The analysis may mean that the player information is shown on a bigger space on the display (i.e. full screen). When the detailed player information is shown, the first marker 796 may be shown to be associated with training load, as shown in FIG. 7D.

Referring to FIG. 7C, in step 730, the portable electronic device 124 may calculate the collective physical activity value for the group of users based on the physical activity-related information of the group of users. The group of users may comprise two or more users from the users 102 of the team sport activity and/or all the users 102 of the team sport activity. In step 740, the portable electronic device 124 may determine that the collective physical activity value is over a second threshold. The second threshold may be group specific, for example. In step 750, the portable electronic device 124 may associate a second marker to the collective physical activity value indicating the exceeding of the second threshold. Thus, it may be possible to indicate exceeding of threshold for individual users and/or for group of users.

In an embodiment, the portable electronic device 124 obtains information about the first marker and/or the second marker, and performs analysis for the at least one user of the users 102 and/or the group of users on the basis said obtained information. The analysis may comprise, as described, opening the detailed information of the group of users (i.e. attackers of a team) and/or the detailed information of the at least one user.

Figure 7E:
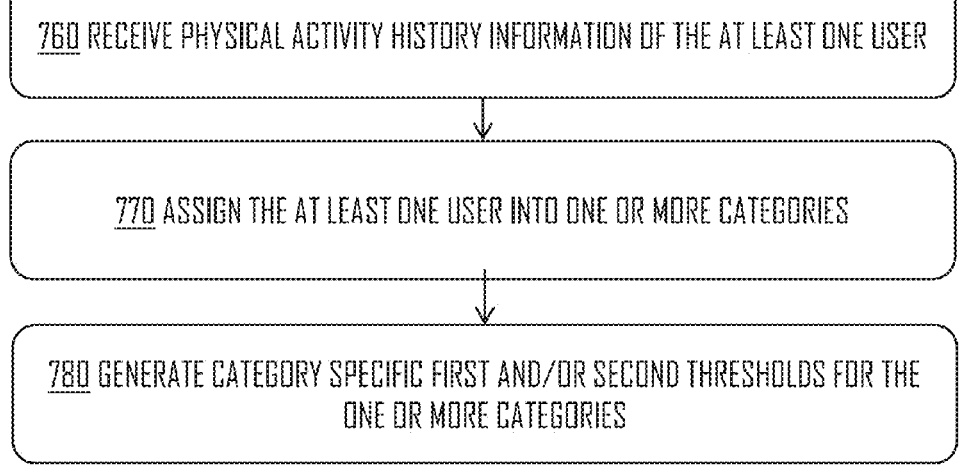

Referring to FIG. 7E, in step 760, the portable electronic device 124 may receive physical activity history information of the at least one user from a web server. The web server may be, for example, the server 134 of FIG. 1. In step 770, the portable electronic device 124 may assign the at least one user into one or more categories based on the received physical activity history information. In step 780, the portable electronic device 124 may generate category specific first threshold and/or category specific second threshold for the one or more categories. This may enable to categorize users 102 and set category specific thresholds for the values of the physical activity-related information.

In an embodiment, the training load and/or the team load is indicated using visual indicators. For example, traffic light-like system may be used. Green may indicate that the training load is at acceptable level. Further, yellow may mean that the training load needs to be monitored with more care. Red may indicate that the training load is over an acceptable level, and thus the training should be stopped.

In an embodiment, the physical activity history information, received from the web server, is used to categorize the users 102 into one or more categories, wherein the categories are indicated with the traffic light-like system. For users in red category, thresholds may be lower than for users in yellow and green categories. The colors may indicate recovery status of the users 102, wherein the recovery status may indicate how much training, and at what intensity the training, should be performed.

In an embodiment, thresholds, such as the first and the second thresholds, are transmitted, by the portable electronic device 124, to the training devices 110. Thus, the portable electronic device may set the thresholds to the training devices 110.

In an embodiment, the first and/or the second markers comprise recorded speech, image(s), video(s) and/or text string. The markers may comprise marker identification and/or time stamp. For example, if the marker relates to exceeding of a heart rate limit, the marker may indicate the exceeding on a heart rate graph with a text that is placed substantially on the spot where the heart rate limit is exceeded. Further, the marker may indicate a time period where the heart rate is exceeded as the exceeding may last for some time.

Figure 8A:
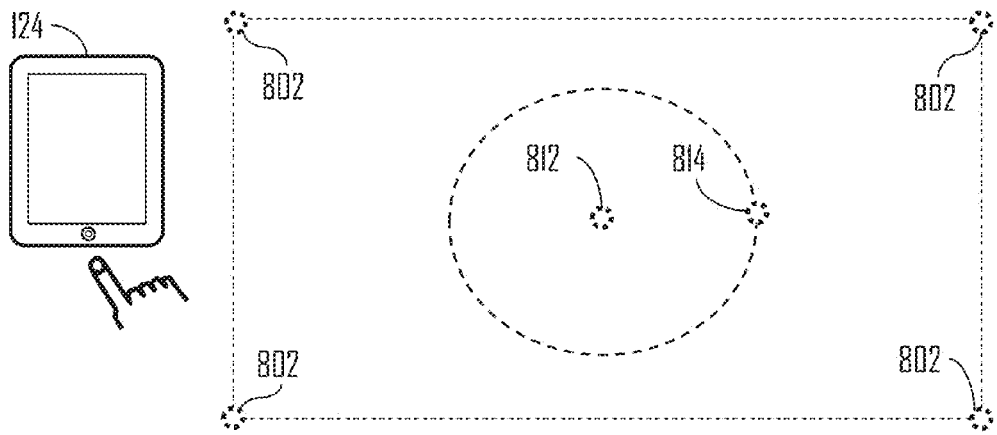
FIGS. 8A to 8B illustrate some embodiments of the invention.
Figure 8B:
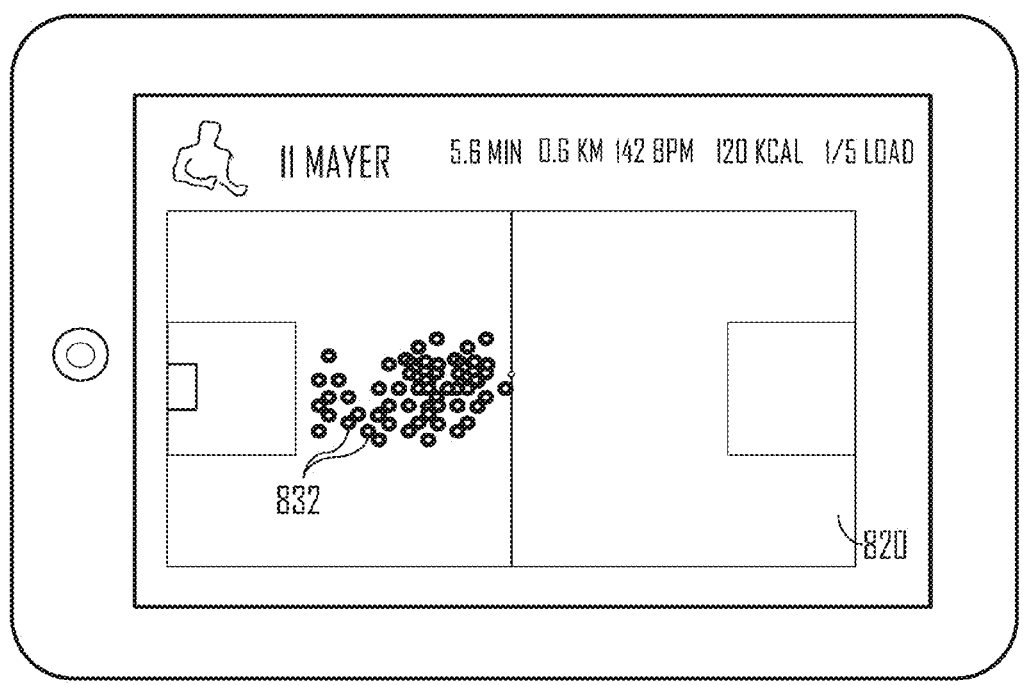

FIGS. 8A to 8B illustrate some embodiments of the invention. Referring to FIG. 8A, the portable electronic device 124 may receive field information of a field used for the team sport activity. For example, the field may be a football field that is outside, or a basketball court that is inside a building, to name two examples. The field information may comprise, for example, a map of the field, corner points of the field and/or lines of the field. The portable electronic device 124 may generate virtual lines of the field based on the field information. Thus, the portable electronic device 124 may be aware of the location of the training devices 110 on the field, as the virtual lines may correspond to the actual field lines.

In an embodiment, the field information is acquired by walking the field lines with the portable electronic device 124, wherein the positioning sensor, such as GPS and/or indoor positioning circuitry, is used to track the field lines.

In an embodiment, the portable electronic device 124 detects user input on corners 802 of the field, and determines the location of the portable electronic device 124. By collecting two or more corner positions the virtual lines may be generated. For example, if the portable electronic device 124 collects four corner positions, the virtual lines may be generated between the four corner positions as shown in FIG. 8A.

In an embodiment, a first user input 812 is detected at the center of the field. The coach may then travel to an edge of the field, wherein the portable electronic device 124 may detect a second user input 814 (i.e. coach pressing a button), and generate the virtual line according to the first and the second inputs. Thus, a circular line may be drawn. This may be beneficial in team sports where the field is circular.

Referring to FIG. 8A, it may be possible, in addition to generating the virtual lines, generate information about different area(s) of the field. For example, if the virtual lines are known, the field ends and/or attacking zone(s) may be determined. It is then possible to draw a detailed virtual map of the team sport activity comprising lines and different area(s) of the field.

Referring to FIG. 8B, the portable electronic device 124 may generate a heat map 820 of at least one user of the users 102 indicating position of the at least one user in relation to time. The generation of the heat map may be based on the virtual lines of the field and physical activity-related information comprising location information of the at least one user. The heat map 820 may comprise a plurality of location measurements 832 which indicate the position of the at least one user in relation to time on the field. Different colors may be used in the heat map to indicate the areas on which the at least one user has been to. Different colors may be used so that the colors indicate intensity of the at least one user's positions. For example, red may indicate that the at least one user has been on the red areas the most.

In an embodiment, the portable electronic device 124 is a portable apparatus.

In an embodiment, at least some of the processes described in connection with FIGS. 1 to 8B may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 8B or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 8B, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIG. 1 to x may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A training device comprising:
    a communication circuitry configured to communicate according to a short-range wireless protocol;
    at least one processor; and
    at least one memory including a computer program code, wherein the at least one memory and the computer program code are configured, with the at least one processor, to cause the training device to perform operations comprising:
    obtaining, using at least one sensor, physical activity-related measurement data of a user participating in a team sport activity, the at least one sensor comprising at least one of a heart activity sensor, motion sensor, positioning sensor, stride sensor, cadence sensor;
    processing the physical activity-related measurement data into a physical activity-related information characterizing the physical activity of the user during the team sport activity;
    broadcasting, according to the short-range wireless protocol, the physical activity-related information using the communication circuitry;
    broadcasting, on a first interval, an advertising packet for a predetermined time, receiving a scan request from a portable electronic device in response to broadcasting the advertising packet, and transmitting, in response to receiving the scan request, a scan response comprising at least some of the physical activity-related information;
    preparing the physical activity-related information for broadcasting, according to the short-range wireless protocol, by splitting the physical activity-related information into two or more sub-sets;
    adding an indicator for each of the sub-sets indicating that the two or more sub-sets are sub-sets of the physical activity-related information; and
    broadcasting, according to the a short-range wireless protocol, the two or more sub-sets using a separate data packet for each of the two or more sub-sets.

2. The training device of claim 1, wherein the training device is one of a plurality of training devices, wherein the broadcasting further comprises broadcasting an identifier, and wherein the identifier is unique to the training device among the plurality of training devices.

3. The training device of claim 1, wherein the physical activity-related information comprises at least one of user time on heart rate zones, travelled distance on speed zones by the user, cadence information of the user, number of accelerations by the user, position information of the user, training load of the user, recovery time of the user, calories burnt by the user, core temperature of the user.

4. The training device of claim 1, wherein the training device comprises user specific configuration information, and wherein the physical activity-related measurement data is processed into the physical activity-related information based, at least partly, on the user specific configuration information.

5. The training device of claim 1, wherein the broadcasting further comprises:
    after the predetermined time, broadcasting the advertising packet on a second interval, wherein the second interval is longer compared to the first interval.

6. The training device of claim 1, wherein the at least one memory and the computer program code are configured, with the at least one processor, to cause the training device further to perform operations comprising:
    detecting that the training device is connected to a docking station, wherein the connection enables information transfer between the training device and the docking station, and recharging a battery of the training device.

7. The training device of claim 1, wherein the at least one memory and the computer program code are configured, with the at least one processor, to cause the training device further to perform operations comprising:
    storing the physical activity-related information for later use; and
    after detecting that the training device is connected to a docking station, transferring the stored physical activity-related information to a portable apparatus.

8. The training device of claim 1, wherein the at least one memory and the computer program code are configured, with the at least one processor, to cause the training device further to perform operations comprising:
    after detecting that the training device is connected to a docking station, receiving a software update from a portable apparatus.

9. The training device of claim 1, wherein the at least one memory and the computer program code are configured, with the at least one processor, to cause the training device further to perform operations comprising:
    establishing a data transfer connection to a wrist device; and
    transmitting at least some of the physical activity-related information to the wrist device.

10. The training device of claim 1, wherein the at least one memory and the computer program code are configured, with the at least one processor, to cause the training device further to perform operations comprising:
    detecting a user input; and
    as a response to the detecting, displaying an identification, wherein the identification is characteristics to the user of the training device.

11. A non-transitory computer-readable storage medium comprising a computer program comprising computer program code which, when executed by a portable electronic device cause the portable electronic device to perform operations comprising:
    receiving broadcast messages according to a short-range wireless protocol from a plurality of training devices, wherein the broadcast messages comprise physical activity-related information of users participating in a team sport activity, the physical activity-related information being obtained by using at least one sensor, the at least one sensor comprising at least one of a heart activity sensor, motion sensor, positioning sensor, stride sensor, cadence sensor;

identifying a user to which the received physical activity-related information is related to;

updating physical activity-related information of the user according to the received physical activity-related information;

detecting at least one advertising packet from the plurality of training devices, responding to the at least one advertising packet by transmitting at least one scan request, and receiving, in response to transmitting the at least one scan request, at least one scan response comprising at least some of the physical activity related-information;

receiving two or more data packets, wherein the two or more data packets comprise an indicator indicating that the two or more data packets are sub-sets of the physical activity-related information; and uniting the two or more data packets, based on the indicator of the two or more data packets.

12. The non-transitory storage medium of claim 11, wherein the computer program code which, when executed by a portable electronic device cause the portable electronic device further to perform operations comprising:

displaying physical activity information of at least one user, wherein the physical activity-related information comprises at least one of user time on heart rate zones, travelled distance on speed zones by the user, cadence information of the user, number of accelerations by the user, position information of the user, training load of the user, recovery time of the user, calories burnt by the user, core temperature of the user.

13. The non-transitory storage medium of claim 11, wherein the computer program code which, when executed by a portable electronic device cause the portable electronic device further to perform operations comprising:

determining that a value of the physical activity-related information of the at least one user is over a first threshold; and associating a first marker to the physical activity-related information of the at least one user indicating the exceeding of the first threshold.

14. The non-transitory storage medium of claim 11, wherein the computer program code which, when executed by a portable electronic device cause the portable electronic device further to perform operations comprising:

calculating a collective physical activity value for a group of users based on the physical activity-related information of the group of users;

determining that the collective physical activity value is over a second threshold; and associating a second marker to the collective physical activity value indicating the exceeding of the second threshold.

15. The non-transitory storage medium of claim 13, wherein the computer program code which, when executed by a portable electronic device cause the portable electronic device further to perform operations comprising:

obtaining information about at least one of the first marker, a second marker;

performing an analysis for at least one of the at least one user, the group of users on the basis said obtained information.

16. The non-transitory storage medium of claim 13, wherein the computer program code which, when executed by a portable electronic device cause the portable electronic device further to perform operations comprising:

receiving physical activity history information of the at least one user from a web server;

assigning the at least one user into one or more categories based on the received physical activity history information; and generating at least one of category specific first threshold, category specific second threshold for the one or more categories.

17. The non-transitory storage medium of claim 11, wherein the computer program code which, when executed by a portable electronic device cause the portable electronic device further to perform operations comprising:

receiving field information of a field used for the team sport activity; and generating virtual lines of the field based on the field information.

18. The non-transitory storage medium of claim 17, wherein the computer program code which, when executed by a portable electronic device cause the portable electronic device further to perform operations comprising:

based on the virtual lines of the field and physical activity-related information, generating a heat map of the at least one user indicating position of the at least one user in relation to time.

19. A system for monitoring a team sport activity, the system comprising:

a plurality of training devices, wherein the plurality of training devices comprises a communication circuitry configured to communicate according to a short-range wireless protocol;

a portable electronic device comprising a communication circuitry configured to communicate according to the short-range wireless protocol; and a docking station comprising connection members for the plurality of training devices and the portable electronic device, wherein the connection members enable recharging of the plurality of training devices and the portable electronic device, and data transmission between the docking station and the plurality of training devices and the portable electronic device, wherein the plurality of training devices are configured to obtain physical activity-related measurement data of users participating in the team sport activity, to process the physical activity-related measurement data into a physical activity-related information characterizing the physical activity of the users during the team sport activity, and to broadcast, according to the short-range wireless protocol, the physical activity-related information, and wherein the portable electronic device is configured to receive at least some of the broadcasted information, wherein the physical activity-related information is obtained by using at least one sensor, the at least one sensor comprising at least one of a heart activity sensor, motion sensor, positioning sensor, stride sensor, cadence sensor, the plurality of training devices performing operations comprising:

broadcasting, on a first interval, an advertising packet for a predetermined time, receiving a scan request from a portable electronic device in response to broadcasting the advertising packet, and transmitting, in response to receiving the scan request, a scan response comprising at least some of the physical activity-related information;

the portable electronic device performing operations comprising:
- receiving broadcast messages according to the short-range wireless protocol from a plurality of training devices, wherein the broadcast messages comprise physical activity-related information of users participating in a team sport activity, the physical activity-related information being obtained by using at least one sensor, the at least one sensor comprising at least one of a heart activity sensor, motion sensor, positioning sensor, stride sensor, cadence sensor;
- identifying a user to which the received physical activity-related information is related to;
- updating physical activity-related information of the user according to the received physical activity-related information;
- detecting at least one advertising packet from the plurality of training devices, responding to the at least one advertising packet by transmitting at least one scan request, and receiving, in response to transmitting the at least one scan request, at least one scan response comprising at least some of the physical activity related-information;
- receiving two or more data packets, wherein the two or more data packets comprise an indicator indicating that the two or more data packets are sub-sets of the physical activity-related information; and
- uniting the two or more data packets, based on the indicator of the two or more data packets.

* * * * *